United States Patent
Feiste et al.

[11] Patent Number: 6,021,485
[45] Date of Patent: Feb. 1, 2000

[54] FORWARDING STORE INSTRUCTION RESULT TO LOAD INSTRUCTION WITH REDUCED STALL OR FLUSHING BY EFFECTIVE/REAL DATA ADDRESS BYTES MATCHING

[75] Inventors: Kurt Alan Feiste; John Stephen Muhich; Larry Edward Thatcher; Steven Wayne White, all of Austin, Tex.

[73] Assignee: International Business Machines Corporation, Armonk, N.Y.

[21] Appl. No.: 08/826,854

[22] Filed: Apr. 10, 1997

[51] Int. Cl.[7] ....................................... G06F 9/34
[52] U.S. Cl. ...................... 712/216; 712/218; 712/225
[58] Field of Search .............................. 395/185.03, 392, 395/800.23, 566; 711/141, 151; 712/216, 225, 218

[56] References Cited

U.S. PATENT DOCUMENTS

| | | | |
|---|---|---|---|
| 5,606,670 | 2/1997 | Abramson et al. ................... 711/154 |
| 5,659,782 | 8/1997 | Senter et al. ................... 712/23 |
| 5,751,946 | 5/1998 | Afsar et al. ................... 714/350 |
| 5,754,812 | 5/1998 | Favor et al. ................... 712/216 |
| 5,784,586 | 7/1998 | Simone et al. ................... 712/216 |

*Primary Examiner*—Kenneth S. Kim
*Attorney, Agent, or Firm*—Kelly K. Kordzik; Winstead Sechrest & Minick P.C.; Anthony V. S. England

[57] ABSTRACT

In a superscalar processor implementing out-of-order dispatching and execution of load and store instructions, when a store instruction has already been translated, the load address range of a load instruction is contained within the address range of the store instruction, and the data associated with the store instruction is available, then the data associated with the store instruction is forwarded to the load instruction so that the load instruction may continue execution without having to be stalled or flushed.

24 Claims, 8 Drawing Sheets

CASE A - NO LOAD STORE OVERLAP
CASE B - NO LOAD HIT STORE (EA OVERLAP CAUSES STALL)
CASE C - LOAD HIT STORE AND UNABLE TO FORWARD DATA →FLUSH
CASE D - LOAD HIT STORE WITH STORE FORWARDING DATA TO LOAD

FIG. 9

| | CYCLE #1 | CYCLE #2 | CYCLE #3 |
|---|---|---|---|
| CASE A | LOAD A — RETURN DATA A | LOAD B — RETURN DATA B | LOAD C — RETURN DATA C |
| CASE B | LOAD A — HOLD A | HOLD A | FLUSH A |
| CASE C | LOAD A — HOLD A | FORWARD TO A — RETURN DATA B | LOAD B — RETURN DATA B |
| CASE D | LOAD A — RETURN DATA A | LOAD B  FLUSH A | |

FORWARDING STORE INSTRUCTION RESULT TO LOAD INSTRUCTION WITH REDUCED STALL OR FLUSHING BY EFFECTIVE/REAL DATA ADDRESS BYTES MATCHING

CROSS-REFERENCE TO RELATED APPLICATIONS

The present application is related to the following applications:

"METHOD FOR FAST UNIFIED INTERRUPT AND BRANCH RECOVERY SUPPORTING FULL OUT-OF-ORDER EXECUTION," U.S. patent application, Ser. No. 08/829,662 (Attorney Docket No. AA9-96-048), now issued U.S. Pat. No. 5,887,161, which is hereby incorporated by reference herein;

"CHECKPOINT TABLE FOR SELECTIVE INSTRUCTION FLUSHING IN A SPECULATIVE EXECUTION UNIT," U.S. patent application, Ser. No. 08/934,910, which is hereby incorporated by reference herein; and "SUPPORT FOR OUT-OF-ORDER EXECUTION OF LOADS AND STORES IN A PROCESSOR," U.S. patent application, Ser. No. 08/829,669, which is hereby incorporated by reference herein.

TECHNICAL FIELD

The present invention relates in general to data processing systems, and in particular, to out-of-order execution of load and store instructions in a processor.

BACKGROUND INFORMATION

To achieve higher performance levels, processor and system designers attempt to increase processor and system clock rates and increase the amount of work done per clock period. Among other influences, striving for higher clock rates drives toward de-coupled designs and semi-autonomous units with minimal synchronization between units. Increased work per clock period is often achieved using additional functional units and attempting to fully exploit the available instruction-level parallelism.

While compilers can attempt to expose the instruction-level parallelism which exists in a program, the combination of attempting to minimize path length and a finite number of architected registers often artificially inhibits a compiler from fully exposing the inherent parallelism of a program. There are many situations (such as the instruction sequence below) where register resources prevent a more optimal sequencing of instructions.

FM FPR5←FPR4, FPR4
FMA FPR2←FPR3, FPR4, FPR5
FMA FPR4←FPR6, FPR7, FPR8

Here, given that most processors have multi-cycle floating point pipelines, the second instruction cannot execute until several cycles after the first instruction starts to execute. In this case, although the source registers of the third instruction might be expected to be available and the third instruction is expected to be ready to execute before the second, the compiler cannot interchange the two instructions without selecting a different register allocation (since the third instruction currently overwrites the FPR4 value used by instruction 2). Often, selecting a register allocation which would be more optimal for this pair of instructions would be in conflict with the optimal register allocation for another instruction pair in the program.

The dynamic behavior of cache misses provides another example where out-of-order execution can exploit more instruction-level parallelism than possible in an in-order machine.

```
Loop:
        Load    GPR4, 8(GPR5)
        Add     GPR6, GPR6, GPR4
        Load    GPR7, 8(GPR3)
        Add     GPR8, GPR8, GPR7
        Load    GPR9, 0(GPR6)
        Load    GPR2, 0(GPR8)
        ...
        branch conditional Loop
```

In this example, on some iterations there will be a cache miss for the first load; on other iterations there will be a cache miss for the second load. While there are logically two independent streams of computation, in an in-order processor, processing will halt shortly after a cache miss and it will not resume until the cache miss has been resolved.

This example also shows a cascading effect of out-of-order execution; by allowing progress beyond a stalled instruction (in this example an instruction which is dependent on a load with a cache miss), subsequent cache misses can be detected and the associated miss penalty can be overlapped (at least partially) with the original miss. The likelihood of overlapping cache miss penalties for multiple misses grows with the ability to support out-of-order load/store execution.

As clock rates go higher and higher, being able to overlap the cache miss penalties with useful computation and other cache misses will be of growing importance.

Many current processors extract much of the available instruction-level parallelism by allowing out-of-order execution for all units except for the load/store unit. Mechanisms to support out-of-order execution for non-load/non-store units is well understood; all potential conflicts between two instructions can be detected by simply comparing the register fields specified statically in the instruction.

Out-of-order execution of storage reference instructions is considerably a more difficult problem as conflicts can arise through storage locations, and the conflicts cannot be detected without the knowledge of the addresses being referenced. The generation of the effective/virtual address and the translations to a real address are normally performed as part of the execution of a storage reference instruction. Therefore, when a storage reference instruction is executed before a logically earlier instruction is executed, the address for the logically earlier instruction is not available for comparison during the execution of the current instruction.

When performing load and store instructions in a machine with out-of-order and overlapping execution, if it is determined that a load instruction in execute has an overlapping address with a prior store which has not completed, it is usually necessary to either stall the load instruction until the store has completed or cancel the load and any subsequent instructions.

Therefore, there is a need in the art for a system and method for forwarding stored data to a load instruction requiring the data without the need to either stall the load instruction until the store has completed or cancel the load and any subsequent instructions.

SUMMARY OF THE INVENTION

The present invention addresses the foregoing need by forwarding store data to a load instruction if the store instruction has already translated, the load address range is contained within the store address range, and the store data is available.

In one embodiment, the present invention performs a match of effective address bits of the store and load instructions on a 12-bit scale. If there is a match, then another matching of effective address bits is performed on a 16-bit scale. If there is a match with this process, then a comparison is performed with respect to the real addresses of the load and store instructions. If the real addresses match, then the store data is forwarded to the load instruction.

In one alternative embodiment, if the real addresses match, then a determination is made whether or not the store-forwarding process is enabled or disabled.

If forwarding of the store data is performed, then the load instruction receives its data from the store data queue rather than the memory subsystem.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 9 illustrates a cycle-by-cycle timing of store forwarding and a load-hit-store scenario in accordance with the present invention.

DETAILED DESCRIPTION

Figure 1:
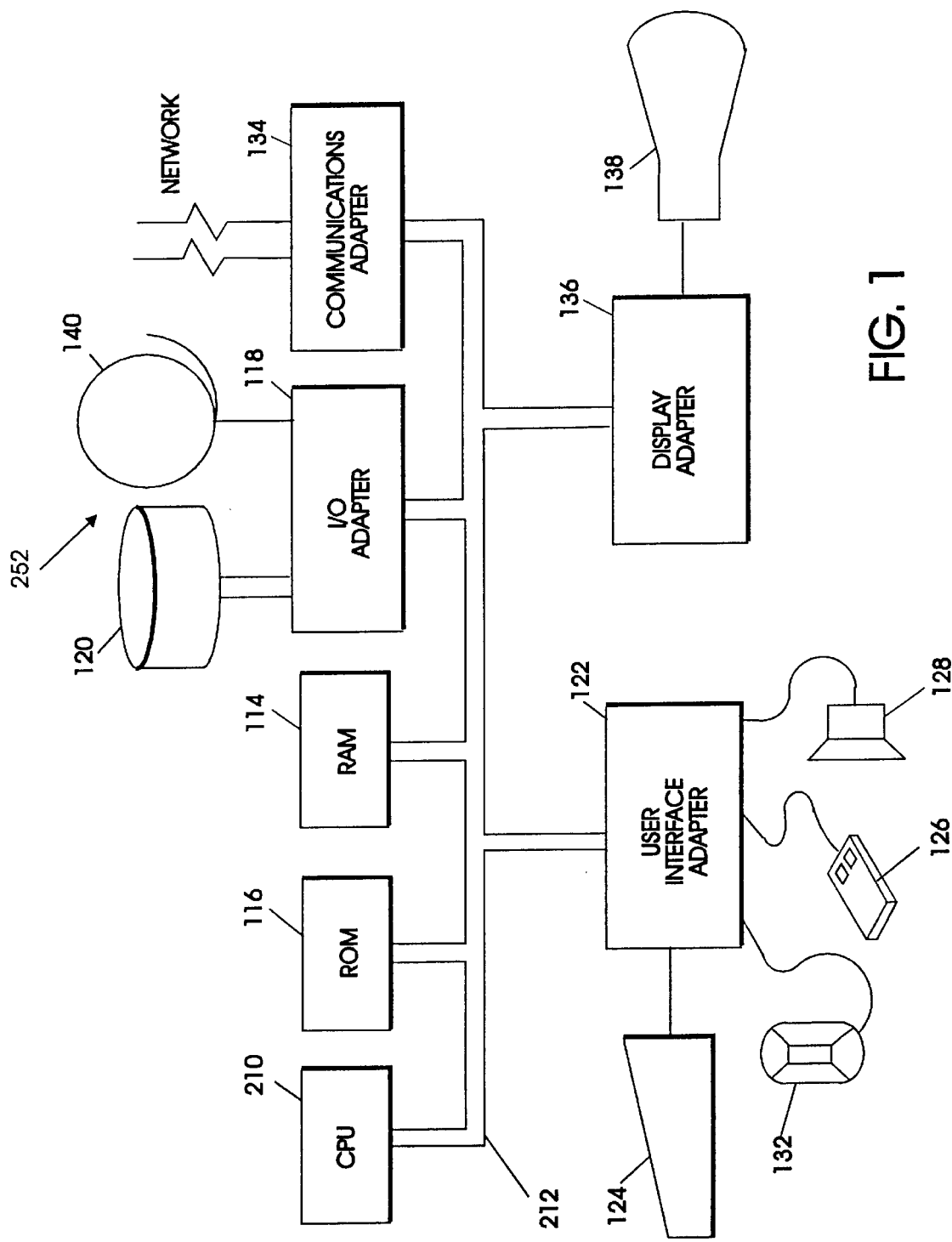
FIG. 1 illustrates a data processing system configurable in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system configurable in accordance with the present invention. The system has a central processing unit ("CPU") 210, such as a PowerPC microprocessor ("PowerPC" is a trademark of IBM Corporation) according to the "*PowerPC Architecture: A Specification for a New Family of RISC Processors*," 2d edition, 1994, Cathy May, et al. Ed., which is hereby incorporated by reference herein. A more specific implementation of a PowerPC microprocessor is described in the "*PowerPC 604 RISC Microprocessor User's Manual*," 1994, IBM Corporation, which is hereby incorporated by reference herein. Many of the acronyms described herein (e.g., to describe a particular instruction) are PowerPC instructions, and may be further described in these references.

The CPU 210 is coupled to various other components by system bus 211. Read only memory ("ROM") 116 is coupled to the system bus 211 and includes a basic input/output system ("BIOS"), which controls certain basic functions of the data processing system. Random access memory ("RAM") 250, I/O adapter 118, and communications adapter 134 are also coupled to the system bus 211. I/O adapter 118 may be a small computer system interface ("SCSI") adapter that communicates with a disk storage device 120 or tape storage drive 140. I/O adapter 118, disk storage device 120, and tape storage device 140 are also referred to herein as mass storage 252. Communications adapter 134 interconnects bus 211 with an outside network enabling the data processing system to communicate with other such systems. Input/output devices are also connected to system bus 211 via user interface adapter 122 and display adapter 136. Keyboard 124, trackball 132, mouse 126, and speaker 128 are all interconnected to bus 211 via user interface adapter 122. Display monitor 138 is connected to system bus 211 by display adapter 136. In this manner, a user is capable of inputting to the system through the keyboard 124, trackball 132, or mouse 126 and receiving output from the system via speaker 128 and display 138. Additionally, an operating system such as AIX ("AIX" is a trademark of the IBM Corporation) is used to coordinate the functions of the various components shown in FIG. 1.

Figure 2:
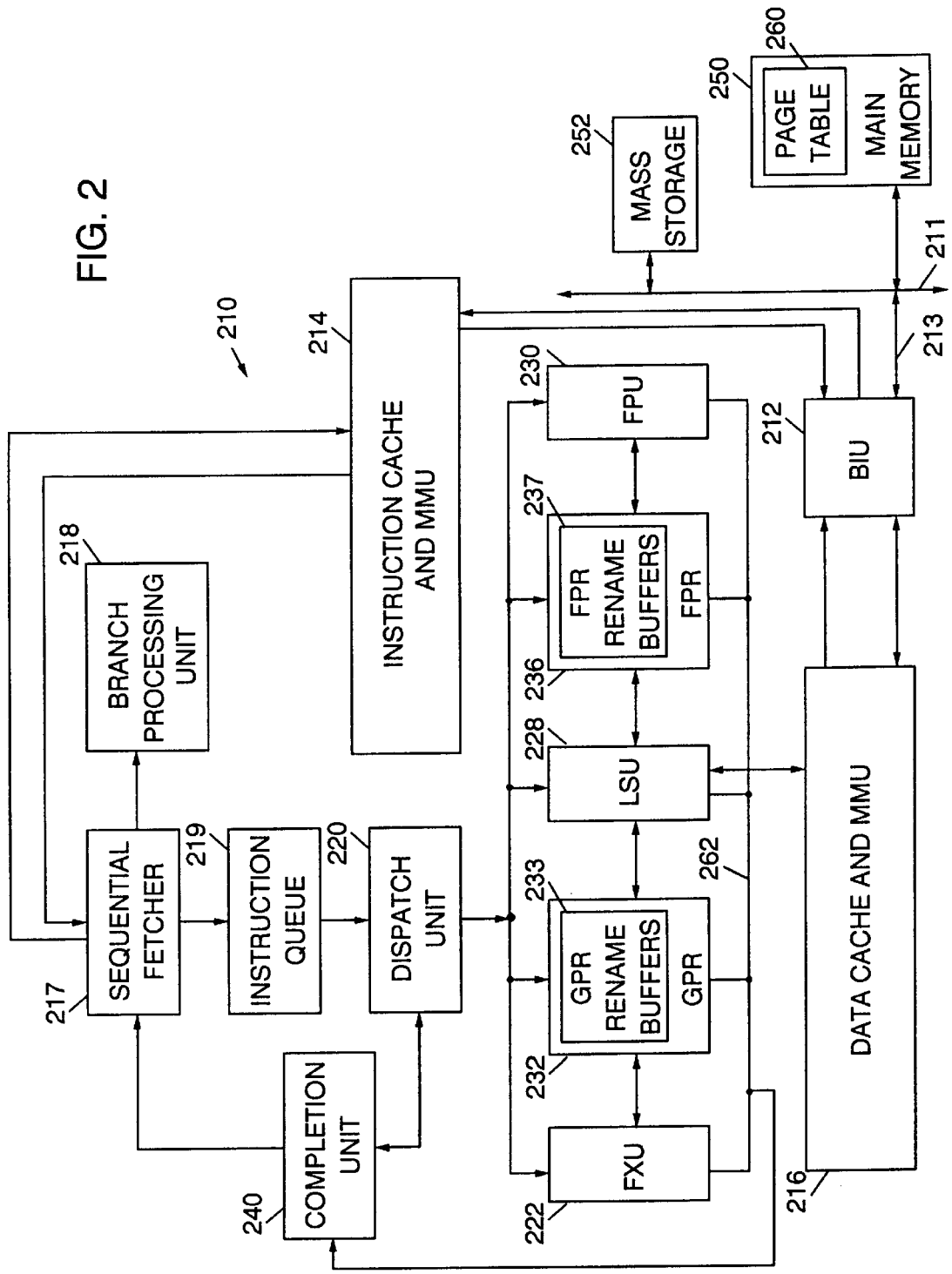
FIG. 2 illustrates a processor configured in accordance with the present invention.

With reference now to FIG. 2, there is depicted a block diagram of an illustrative embodiment of a data processing system for processing information in accordance with the invention recited within the appended claims. In the depicted illustrative embodiment, CPU 210 comprises a single integrated circuit superscalar microprocessor. Accordingly, as discussed further below, CPU 210 includes various execution units, registers, buffers, memories, and other functional units, which are all formed by integrated circuitry. As illustrated in FIG. 2, CPU 210 is coupled to system bus 211 via bus interface unit ("BIU") 212 and processor bus 213, which like system bus 211 includes address, data, and control buses. BIU 212 controls the transfer of information between processor 210 and other devices coupled to system bus 211, such as main memory ("RAM") 250 and nonvolatile mass storage 252, by participating in bus arbitration. The data processing system illustrated in FIG. 2 may include other unillustrated devices coupled to system bus 211, which are not necessary for an understanding of the following description and are accordingly omitted for the sake of simplicity.

BIU 212 is connected to instruction cache and MMU (Memory Management Unit) 214 and data cache and MMU 216 within CPU 210. High-speed caches, such as those within instruction cache and MMU 214 and data cache and MMU 216, enable CPU 210 to achieve relatively fast access times to a subset of data or instructions previously transferred from main memory 250 to the caches, thus improving the speed of operation of the data processing system. Data and instructions stored within the data cache and instruction cache, respectively, are identified and accessed by address tags, which each comprise a selected number of high-order bits of the physical address of the data or instructions in main memory 250. Instruction cache and MMU 214 is further coupled to sequential fetcher 217, which fetches instructions for execution from instruction cache and MMU 214 during each cycle. Sequential fetcher 217 transmits branch instructions fetched from instruction cache and MMU 214 to branch processing unit ("BPU") 218 for execution, but temporarily stores sequential instructions within instruction queue 219 for execution by other execution circuitry within CPU 210.

In the depicted illustrative embodiment, in addition to BPU 218, the execution circuitry of CPU 210 comprises multiple execution units for executing sequential instructions, including fixed-point-unit ("FXU") 222, load/store unit ("LSU") 228, and floating-point unit ("FPU") 230, Each of execution units 222, 228 and 230 typically executes one or more instructions of a particular type of sequential instructions during each processor cycle. For example, FXU 222 performs fixed-point mathematical and logical operations such as addition, subtraction, ANDing, ORing, and XORing, utilizing source operands received from specified general purpose registers ("GPRs") 232. Following the execution of a fixed-point instruction, FXU 222 outputs the data results of the instruction to GPR buffers 232, which provide storage for the result received on result bus 262. Conversely, FPU 230 typically performs single and double-precision floating-point arithmetic and logical operations, such as floating-point multiplication and division, on source operands received from floating-point registers ("FPRs") 236. FPU 230 outputs data resulting from the execution of floating-point instructions to selected FPR buffers 236, which store the result data. As its name implies, LSU 228 typically executes floating-point and fixed-point instructions which either load data from memory (i.e., either the data cache within data cache and MMU 216 or main memory 250) into selected GPRs 232 or FPRs 236 or which store data from a selected one of GPRs 232 or FPRs 236 to memory 250.

CPU 210 employs both pipelining and out-of-order execution of instructions to further improve the performance of its superscalar architecture. Accordingly, instructions can be executed by FXU 222, LSU 228, and FPU 230 in any order as long as data dependencies are observed. In addition, instructions are processed by each of FXU 222, LSU 228, and FPU 230 at a sequence of pipeline stages. As is typical of high-performance processors, each sequential instruction is processed at five distinct pipeline stages, namely, fetch, decode/dispatch, execute, finish, and completion.

During the fetch stage, sequential fetcher 217 retrieves one or more instructions associated with one or more memory addresses from instruction cache and MMU 214. Sequential instructions fetched from instruction cache and MMU 214 are stored by sequential fetcher 1217 within instruction queue 219. In contrast, sequential fetcher 217 removes (folds out) branch instructions from the instruction stream and forwards them to BPU 218 for execution. BPU 218 includes a branch prediction mechanism, which in one embodiment comprises a dynamic prediction mechanism such as a branch history table. That enables BFU 218 to speculatively execute unresolved conditional branch instructions by predicting whether or not the branch will be taken.

During the decode/dispatch stage, dispatch unit 220 decodes and dispatches one or more instructions from instruction queue 219 to execution units 222, 228, and 230, typically in program order. In a more conventional processor, dispatch unit 220 allocates a rename buffer within GPR rename buffers 233 or FPR rename buffers 237 for each dispatched instruction's result data, and at dispatch, instructions are also stored within the multiple-slot completion buffer of completion unit 240 to await completion. However, the present invention is adaptable to embodiments which require neither rename registers or completion units. According to the depicted illustrative embodiment, CPU 210 tracks the program order of the dispatched instructions during out-of-order execution utilizing unique instruction identifiers.

During the execute stage, execution units 222, 228, and 230 execute instructions received from dispatch unit 220 opportunistically as operands and execution resources for the indicated operations become available. In one embodiment, each of execution units 222, 228, and 230 are equipped with a reservation station that stores instructions dispatched to that execution unit until operands or execution resources become available. After execution of an instruction has terminated, execution units 222, 228, and 230 store data results, if any, within either GPRs or FPRs, depending upon the instruction type. In more conventional processors, execution units 222, 228, and 230 notify completion unit 240 which instructions have finished execution. Finally, instructions are completed in program order out of the completion buffer of completion unit 240, Instructions executed by FXU 222 and FPU 230 are completed by transferring data results of the instructions from GPR rename buffers 233 and FPR rename buffers 237 to GPRs 232 and FPRs 236, respectively. Load and store instructions executed by LSU 228 are completed by transferring the finished instructions to a completed store queue or a completed load queue from which the load and store operations indicated by the instructions will be performed.

The invention utilizes the dispatch logic of the processor to "tokenize" a classical Von Neumann instruction stream into a data flow-style format. Thus, data dependencies are not handled by tracking the storage location of source data required by each instruction, as in register renaming, but rather by associating with an instruction certain information which enables tracking source data by reference to another instruction which is to provide the source data. Accordingly, the processor is provided with a target identification ("TID") generator which generates tokens, or tags, each of which is uniquely associated with an instruction upon dispatch. The TIDs are used to retain program order information and track data dependencies.

The dispatch unit 220 in the present invention not only assigns TIDs and dispatches instructions, but also updates various tables which are used to track the status of the dispatched instructions.

The CPU 210 supports out-of-order speculative instruction execution. Instructions may be speculative on a predicted branch direction or speculative beyond an instruction that may cause an interrupt condition. In the event of a branch misprediction or an interrupt, hardware automatically flushes undesired instructions from the pipelines and discards undesired results, presenting the effect of precise exceptions and sequentially executed instructions down the appropriate branch paths. Incorrect speculative results are selectively flushed from all units in one clock cycle, and instruction dispatch can resume the following clock cycle. One group identifier tag ("GID") is assigned per set of instructions bounded by outstanding branch or interruptible instructions.

This invention will be described in terms of an implementation that includes multiple load units and a single store unit. However, it should be clear to one skilled in the art that this invention could be modified to handle other configurations such as a single load/store unit, etc. The proposed invention allows loads to execute out of order with respect to other loads and stores and it allows stores to execute out of order with respect to all loads.

As described above, all instructions are tagged in such a manner that relative age between any two instructions can be easily determined. The mechanism that will be assumed for this description is that of monotonically increasing values (TID). The TID value of each instruction is associated with queue entries and pipeline stages in which it resides.

This TID-based approach allows hardware to implement an instruction flush mechanism (to respond to a processor-generated flush command) by performing a magnitude comparison between the TID associated with the flush command and the TID associated with a particular queue entry or functional unit stage and invalidating the entry if it is for an instruction which is as young or younger than the flushed instruction. All remnants of the flushed instruction (and all subsequent instructions) are "flushed" from the machine and the fetch unit is redirected to fetch starting at the address of the "flushed" instruction.

Figure 3:
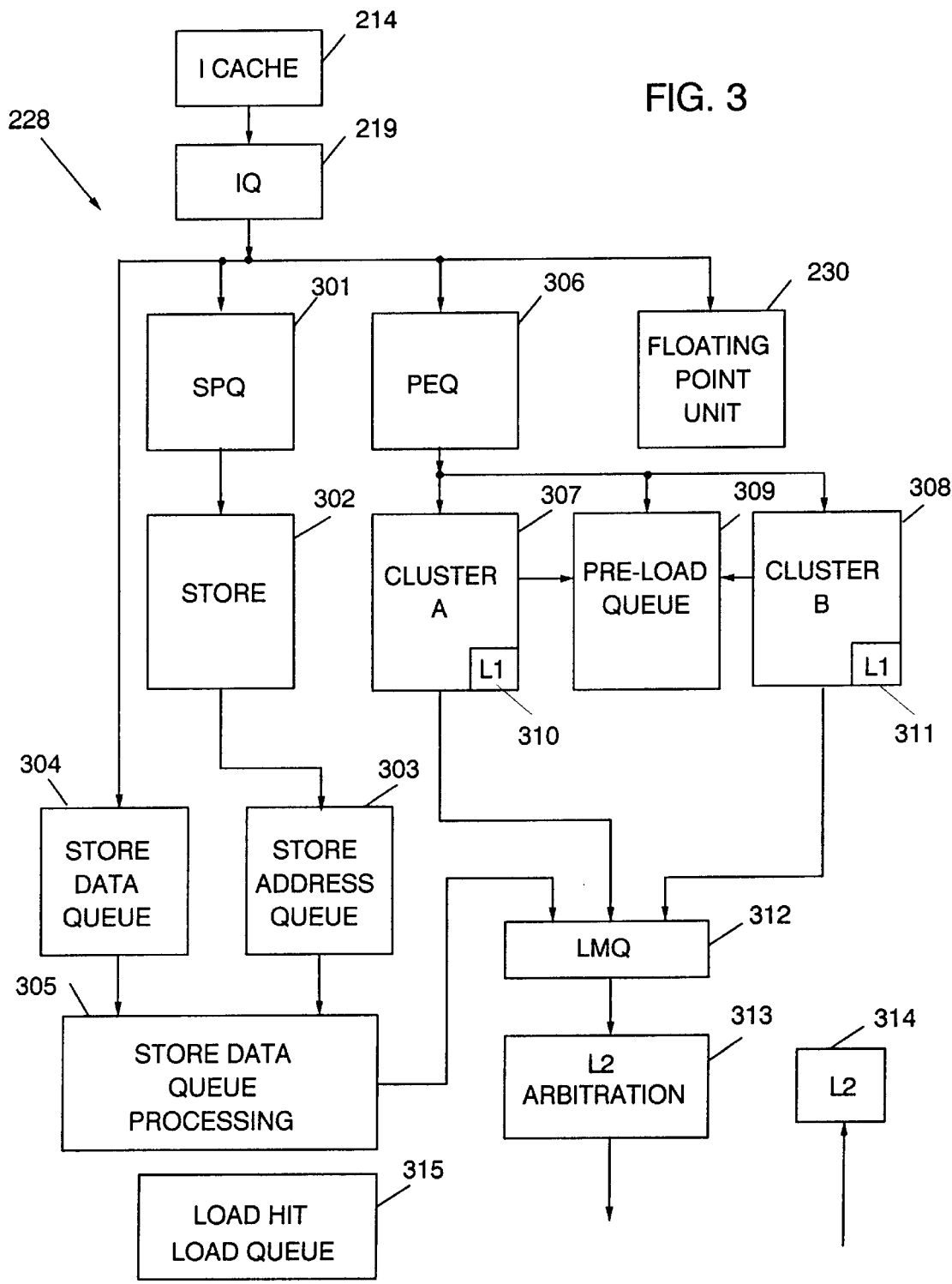
FIG. 3 illustrates further detail of a load/store unit configured in accordance with the present invention.

Refer next to FIG. 3, where there is illustrated further detail of load/store unit 228 coupled to instruction queue 219 and instruction cache 214. Also illustrated is floating point unit 230. FIG. 3 illustrates the basic functional units and instruction queues. The functional units are cluster A 307, cluster B 308, and store unit 302. This invention centers around three queues and the interlocks between both these queues and the load and store units. The three queues are:

store address queue 303,
"preload" queue 309, and
"load-hit-load" queue 315.

Entries in each of these queues typically include the TID (or age indicator) of the instruction associated with the entry, the operand address, and the operand byte count. This information allows relative age determination between an entry and any other storage reference, as well as allows overlap detection, down to the byte level if desired.

In one embodiment, "below" dispatch and "above" the load and store units are two instruction queues: all dispatched loads are queued in the "PEQ" 306 while waiting to execute in a load unit, all stores are queued in the "SPQ" 301 while waiting for the store unit 302. At the start of each cycle, hardware determines which store is the oldest dispatched store that has not yet translated, if any such stores exist. For the instruction queue structure described above, this consists of examining the store unit (or units) for any untranslated stores. If any exist, the oldest one is deemed the "oldest untranslated store." If none exist, the SPQ 301 is examined to find the oldest untranslated store. If such a store is found, it is deemed as the "oldest untranslated store." If none are found, the "oldest untranslated store" pointer defaults to the next instruction to be dispatched.

The store address queue 303 is a FIFO list of all stores that have translated, but the associated data has not yet been written to the L1 cache 310, 311. Entries are created as a result of the translation of store instructions at execute; entries are removed as a result of writing the associated data to the L1 cache 310, 311. Associated with the store address queue 303 is the store data queue 304. As stores are dispatched, entries are allocated in the store data queue 304. If the store data is available as the entry is allocated, the data is placed in the store data queue 304. Otherwise, as the data is generated by the functional units, the store data queue 304 will snoop the result buses and capture the data in the store data queue 304. Like the store address queue 303, entries are removed as bytes are written to the L1 cache 310, 311.

The store data queue 304 and the store address queue 303 are coupled to the store data queue processing unit 305, which is coupled to the load miss queue 312, which is coupled to the L2 cache arbitration logic 313. Further description of these units is not presented, since such a description is not necessary for describing the present invention. Please note that other functional blocks may be implemented within load/store execution unit 228, but have not been shown for reasons of simplicity and clarity.

If both the execution unit 302 and SPQ 301 were examined concurrently and with equal weight, then this invention is extendable to the case where stores are executed out of order with respect to other stores. In this description, it is assumed that stores execute in order; therefore, the execution unit 302 is examined first and with higher priority for establishing a store as the "oldest untranslated store." In-order execution of stores also implies that the store address queue 303 can be managed as a first-in-first-out (FIFO) queue while avoiding deadlock concerns stemming from store address queue space.

The preload queue 309 is specific to this invention and holds the addresses of all translated loads which logically follow the "oldest untranslated store." At the start of each cycle, it is determined whether any loads executing in the load unit are logically subsequent instructions to the "oldest untranslated store." If they are, then they are considered "preloads" and require an entry in the preload queue 309 to execute. If no room exists in the preload queue 309 and an entry is needed, one of two actions results:

If the load in execute is younger than (logically subsequent to) all loads in the preload queue 309, then this load (and all subsequent instructions) is flushed from the machine 210 and the instruction fetch unit 217 is redirected to begin fetching at the address of the flushed load instruction.

If an entry in the preload queue 309 is younger than the load in execute that requires a preload queue entry, then the youngest load in the preload queue 309 (and subsequent instructions) is flushed and re-fetched and the load in execute is given the flushed load's entry in the preload queue 309.

For implementations that allow more than one load in execute to require a preload queue entry in the same cycle, the above is modified in a straightforward manner, namely the results are as if the loads are processed by the above rules, one load at a time, starting with the oldest load. For example, if two loads in execute each require a preload queue entry and only one entry exists, then the oldest load in execute gets the available entry and then the youngest load in execute follows the rules above, for a full queue 309.

At the end of each cycle, valid entries in the preload queue 309 are compared to the "oldest untranslated store" age; any entries which are older than (logically prior to) the "oldest untranslated store" are invalidated (discarded). Preload queue entries can also be invalidated as a result of a flush command if the preload queue entry is for a load instruction which is the subject (or younger) instruction of a flush command.

The store address queue 303 contains the addresses of stores that have been translated but have not yet written their data to the L1 cache 310, 311. In addition to the purposes used by this invention, this queue 303 allows stores to be translated and exceptions detected without waiting for the store data. De-coupling these two portions of a store instruction is key to de-coupling the fixed-point portion of the processor 210 (which usually does the address generation/translation for storage references) from the floating-point portion 230 (which generates/normalizes floating-point data). Several current designs include such store address queues 303. As in most existing implementations, the store address queue 303 is managed in a FIFO manner and the oldest entry in the store address queue 303 is the next entry to write to the L1 cache 310, 311. It should be clear to one skilled in the art that entries other than the oldest entry could be written to the L1 cache 310, 311, allowing younger stores with data to write ahead of older stores waiting on data. It should also be clear that the invention as described would not require modification to handle this improvement.

Store address queue entries are invalidated (discarded) under two conditions:

The associated store operation has been performed to the L1 cache 310, 311, or

A flush command signals that a store address queue entry should be discarded because it is younger than the subject of an instruction flush command.

The load-hit-load queue 315 is specific to this invention and holds the addresses of all translated loads that logically follow the oldest untranslated load or store. At the start of each cycle, it is determined whether any loads executing in the load unit are logically subsequent instructions to the oldest untranslated load or store. If they are, then they require an entry in the load-hit-load queue 315 to execute. If no room exists in the load-hit-load queue 315 and an entry is needed, one of two actions results:

If the load in execute is younger than (logically subsequent to) all loads in the load-hit-load queue 315, then this load (and all subsequent instructions) is flushed from the machine 210 and the instruction fetch unit 217 is redirected to begin fetching at the address of the flushed load instruction.

If an entry in the load-hit-load queue 315 is younger than the load in execute which requires a preload queue entry, then the youngest load in the load-hit-load queue 315 (and subsequent instructions) is flushed and re-fetched and the load in execute is given the flushed load's entry in the load-hit-load queue 315.

For implementations that allow more than one load in execute to require a load-hit-load queue entry in the same cycle, the above is modified in a straightforward manner, namely the results are as if the loads are processed by the above rules, one load at a time, starting with the oldest load. For example, if two loads in execute each require a load-hit-load queue entry and only one entry exists, then the oldest load in execute gets the available entry and then the youngest load in execute follows the rules above for a full queue 315.

At the end of each cycle, valid entries in the load-hit-load queue 315 are compared to the oldest untranslated load or store age; any entries which are older than (logically prior to) the oldest untranslated load and oldest untranslated store are invalidated (discarded). Load-hit-load queue entries can also be invalidated as a result of a flush command if the load-hit-load queue entry is for a load instruction which is the subject (or younger) instruction of a flush command.

Note that the preload queue 309 and load-hit-load queue 315 contain similar information and, in some implementations, could be merged into a single structure.

The above description details the conditions under which entries are created and discarded in the three primary queues for this invention: the preload queue 309, the store address queue 303, and the load-hit-load queue 315. This next section details the address checks which are performed between queue entries to provide architectural storage consistency requirements described previously herein.

An example to consider is where a load requires data from a store the load executes after the store executed, and the load operation got data from the L1 cache 310, 311 while the store operation was still queued in the store address queue 303 (i.e., prior to the store operation updating the L1 cache 310, 311; also referred to as completing)

If the store has already translated, the load address range is contained within the store address range, and the store data is available, then it is possible to forward the store data to the load instruction and allow the machine 210 to proceed with execution. Store forwarding/load-hit-store detection logic of the present invention takes advantage of optimizations which are possible due to processor 210 breaking up loads and stores across 32-byte and 16-byte boundaries, respectively. In addition, restrictions on which data can be forwarded allows optimization of the formatting and forwarding hardware. Due to the latencies of translating addresses during the load/store execute cycle, it may be desirable for performance reasons to partition the forwarding test into multiple tests based on the page offset bits followed by a test on the translated bits of the load and store addresses. The overlap test which involves committing an instruction is based on real addresses due to the possibility of aliasing; however, prediction of load-hit-store and possible forwarding can be performed based on the effective address for speculative execution.

Store forwarding is a special case of the load-hit-store scenario and therefore also shares some of the hardware with the load-hit-store detect logic. The load-hit-store and store-hit-load mechanisms are described in cross-referenced U.S. patent application Ser. No. 08/829,669. When a load-hit-store scenario occurs, if the load address range is contained within the store address range, and the conditions described below are satisfied, then the load instruction receives its data from the store data queue 304 rather than the L1 cache 310, 311 or other memory subsystem components.

The following is an overview of the forwarding operation. If a load instruction (including all fixed-point and floating-point loads, LWARX, ECIWX, but not load multiple/string: LMW, LSWX, and LSWI) executes during cycle 1, and it hits (low-order 16-bit effective address op size compare) against a (logically prior) store operation (in this context, "store" includes all instructions which require a store address queue entry: fixed-point and floating-point stores, STWCX, SYNC, ICBI, DCBx, EIEIO, TLBSYNC, TLBIE, and ECOWX) in the store address queue 303, the load will be held in the cluster execution unit 307, 308 and re-executed for one cycle. In determining if a store address queue entry is logically prior to the subject load, the associated TIDs are compared. All store address queue entries marked as "committed" (the store has been translated and removed from the IIT (not shown)) are guaranteed to be older than this load, regardless of the outcome of a TID comparison. If a load hits against more than one store address queue entry, only the youngest offending store is considered as a hit.

During cycle 2, the 32 real address ("RA") bits of the load and store instructions are compared to determine if it is a true load-hit-store condition. The address/TID comparison is performed during cycle 2 and the store address queue 303 would include any store which translated during cycle 1, but would not include a store that translates during the writeback comparison cycle (cycle 2).

If the 32-bit real address comparison indicates that it not a load-hit-store (i.e., no bytes overlap), then the IDU 220 signals a flush during cycle 3. If the 32-bit real address comparison indicates that it is a load-hit-store (i.e., one or more bytes overlap), then:

a) If store_forwarding is disabled, then the IDU 220 will signal a flush for the load during cycle 3.

b) If store_forwarding is enabled, then during the first cycle of re-execution, the load will complete (with no flushing) if the data is available. The data is available if:

a) the load data is contained in a single SDQ entry;
  b) the data is valid in the SDQ entry;
  c) neither the load nor the store are in I=1 space (both are cacheable addresses);
  d) the load does not span a 16-byte boundary; and
  e) one of the following pairs of store/load size/alignment is true:
    1. STB forwarding to LB
    2. STH forwarding to LH
    3. STW/STFS forwarding to LW or LFS
    4. STWBRX forwarding to LWBRX
    5. STHWBRX forwarding to LHBRX
    6. word-aligned STW forwarding to LB, or LH
    7. word-aligned STFS forwarding to LB, LH, LW, or LFS
    8. word-aligned STFD forwarding to LB, LH, LW, or LFS
    9. word-aligned STMW forwarding to LB, LH, LW, or LFS
    10. word-aligned STSWX/I forwarding to LB, LH, LW, or LFS Cases 9 and 10 are applied as if the SDQ entries were created by a collection of individual word-aligned word accesses (case 6). No forwarding is allowed for case 10 if the word contains less than four bytes.

If the data is not available then the IDU 220 will signal a flush for the load during cycle 3. If the data is available, the data forwarding is delayed by one cycle as compared to an L1 cache-hit case.

The store address queue 303 and store data queue 304 contain additional logic associated with detecting a potential store forwarding scenario, providing the data for store forwarding, and flushing an unsuccessful store forwarding opportunity. The load-hit-store logic and how the effective address and real address comparisons are utilized by the store forwarding logic is described in the following sections. This section describes how the store/load size and alignments (rule e above) determines whether store forwarding can take place and how the necessary formatting is performed. This assumes that load-hit-store overlap has been verified. The data availability and store/load size/alignment of the youngest offending store (rules a through e above) then determines whether forwarding will take place.

The first five items of "rule e" above correspond to an exact size and alignment match between the load and store. Detecting this condition simply requires an exact real address comparison between the load and store (hence, the same alignment), and that the load and store are of the same size. The load and store can be unaligned as long as they do not cross a 16-byte boundary.

Items 6 through 10 of "rule e" allow limited forwarding for loads and stores of differing sizes. If a store word or store double is word aligned, the store data can be forwarded to a load byte and load half in addition to a load word (which also is included in the first five items). Detecting the applicability of items 6 through 10 requires an exact real address comparison between the load and store except for the last two bits. If the load is a byte load, then the store word can be forwarded to the load. If the load is a half word, then the store word can be forwarded to the load as long as the last two bits of the load address are not b'11'.

The first five items of "rule e" do not require any formatting to perform the store forwarding. A 12-port multiplexer (not shown) for each execution cluster 307, 308 chooses a store data queue entry to forward. A signal is sent to the cluster to pass the entry directly to the result bus 262 since no formatting is required. Items 6 through 10 may require the store data to be shifted from 0 to 3 bytes before being returned on the result bus 262. Since the stores in these rules are word aligned, the execution cluster can use the same formatter required from the output of the L1 cache with the controls already correctly configured for the correct shift amount by the load address. The store forwarding logic only needs to indicate if the forwarded data should be taken as is, or if the load formatter must shift the data based on the load address.

When load-hit-store has been detected, and the youngest offending store is determined, the corresponding store data queue entry is selected with a 12-port multiplexer (not shown). Once the execution cluster 307, 308 is held for a load-hit-store condition, the cluster 307, 308 assumes it will receive valid data from the store data queue 304. If the store forwarding rules above are not met, the store forwarding logic will issue a FLUSH of the load instruction.

Figure 4:
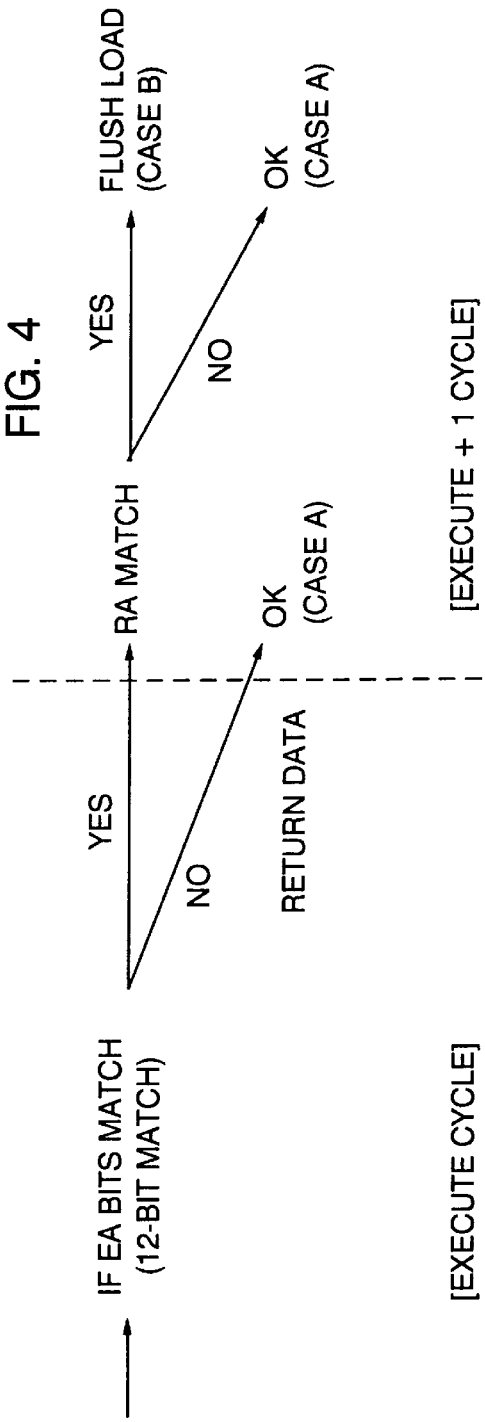
FIG. 4 illustrates a load-hit-store flow chart without store forwarding implemented.
Figure 5:
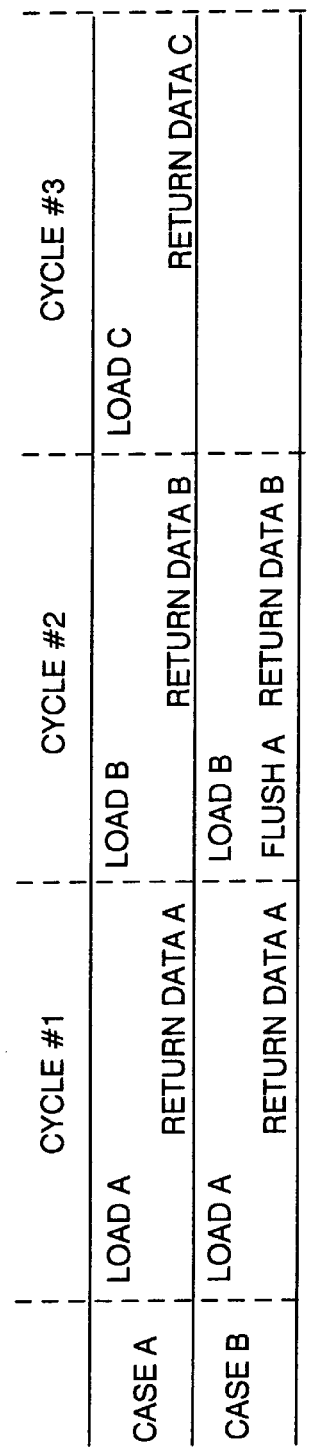
FIG. 5 illustrates cycle-by-cycle timing of a load-hit-store scenario without store forwarding implemented.

FIG. 4 shows a flowchart for load-hit-store detection assuming store forwarding is not implemented. FIG. 5 illustrates the possible timings for loads assuming L1 cache hits and TSA (translation shadow array) hits. During the execute cycle of a load, a 12-bit effective address overlap comparison takes place between the load and every valid entry in the store address queue 303. The 12-bit effective address overlap comparison during the cycle of execute minimizes the comparison logic required during the following cycle when the translated addresses are available. The following cycle, if the load successfully translated, a real address comparison is performed. Because of the 12-bit overlap effective address comparison performed the previous cycle, and the fact that load and store are broken into multiple loads and stores when they cross 32-byte and 16-byte boundaries, only a 24-bit page address equality comparison needs to be performed. Being able to perform the 12-bit overlap comparison before the full translated address reduces the critical path timing since the 12-bit overlap tests consist of a set of magnitude compares which are slower than the 24-bit equality compare. To avoid deadlocks in an out-of-order execution machine, when store forwarding is not supported, if the load overlaps with a store in the store address queue 303, the load and all instructions and results following the load are flushed from the processor 210.

Figure 6:
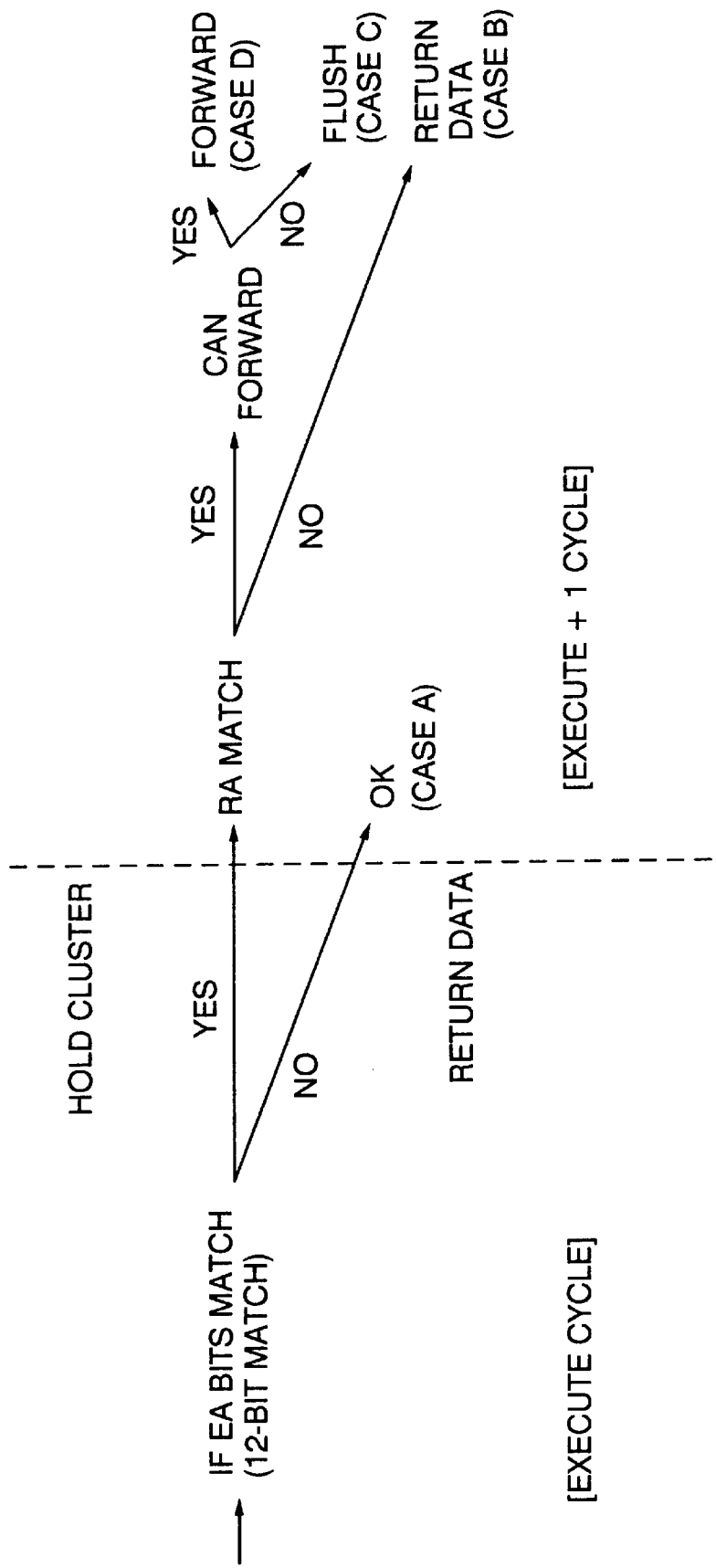
FIG. 6 illustrates a flow chart for detecting a load-hit-store scenario and an implementation of store forwarding.
Figure 7:
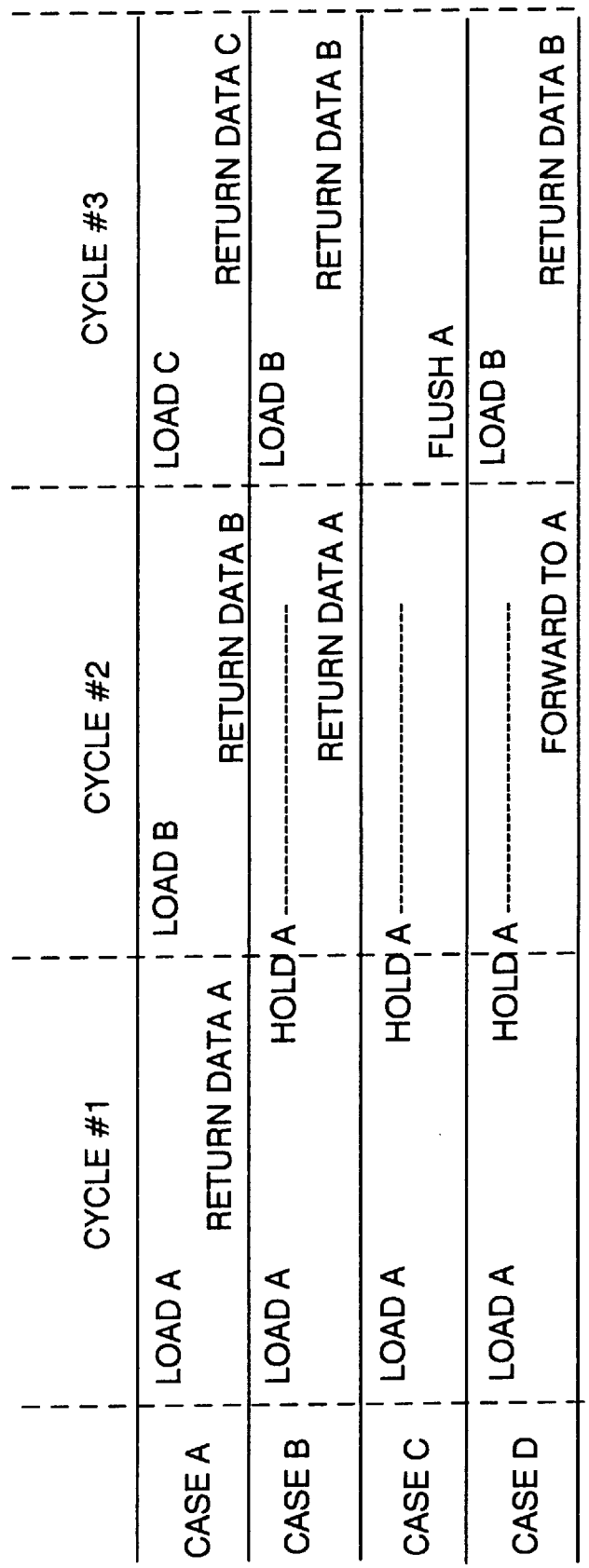
FIG. 7 illustrates a cycle-by-cycle timing of store forwarding in a load-hit-store scenario.

FIG. 6 illustrates the flowchart for detecting a load-hit-store scenario and implementing store forwarding in one embodiment. FIG. 7 illustrates the cycle-by-cycle timing of store forwarding with such a load-hit-store scenario. During the execute cycle of a load, a 12-bit effective address overlap comparison takes place between the load and every valid entry in the store address queue 303. If the 12-bit effective address matches a store address queue entry, the execution cluster 307, 308 is held (stalled). The following cycle, if the load successfully translated, a real address comparison is performed. If the real addresses do not match, then the data loaded from the L1 cache 310, 311 the previous cycle is returned on the results bus 262 to the GPRs 232. If the real addresses match, and the store forwarding rules are met, then the store data is forwarded to the load. If the real addresses match, but the store forwarding request cannot be fulfilled, the load is flushed.

Unfortunately, Case B as shown in FIG. 7 requires the execution cluster 307, 308 to be able to hold the data loaded from the L1 cache 310, 311 during the execute cycle, and forward the data on its result bus 262 the following cycle if the load-hit-store condition is false. This resulted in increasing the cycle time required in an already timing critical path. Another option that was explored involved using the 12-bit EA overlap compare to determine if the cluster 307, 308 should be held (stalled), and then during the following cycle, if store data forwarding could not fulfill the load request, the load would be flushed. This option resulted in excessive load flushing which decreased overall performance.

The present invention implements an alternative store forwarding mechanism, which builds upon the load-hit-store hardware already designed. For the store forwarding to result in a net performance gain, the processor's cycle time could not be lengthened as the embodiment in FIGS. 6 and 7 presented. That embodiment requires a dataflow path to hold the results of a load for a cycle while load-hit-store is determined. This dataflow path can determine the cycle time of the entire chip, so lengthening the path to perform store forwarding does not increase overall performance. An alternative has been developed so holding the load results is not required even though the real address comparison would not take place until the cycle after execute. The decision whether or not to hold the execution cluster is made in the cycle of execute, but once the execution cluster is held (stalled), either data must be forwarded from the store queue, or the load must be flushed.

Figure 8:
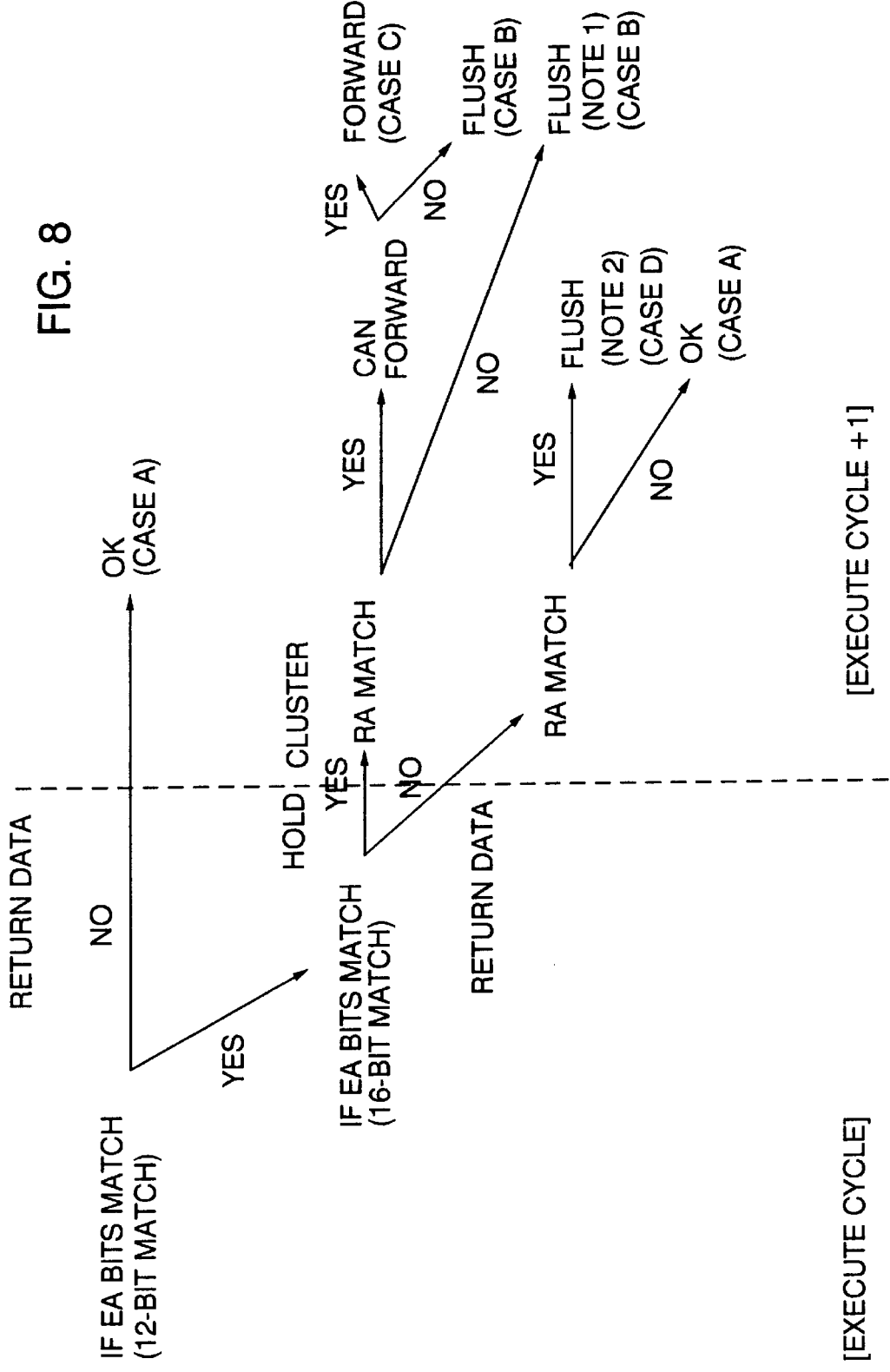
FIG. 8 illustrates a flow chart for detecting a load-hit-store and implementing store forwarding in accordance with the present invention.

This alternative embodiment is shown in FIGS. 8 and 9. Cases A, B, C, D are further described below. During the cycle of execute, both 12-bit and 16-bit effective address overlap compares are performed. If the 12-bit effective address overlap compare is false for all valid store address queue entries, then there is no load-hit-store and the load can return data on its result bus 262 to the GPRs 232. If the 12-bit effective address matches a store address queue entry, but the 16-bit effective addresses do not match, then the invention speculates that there is no load-hit-store and the cluster 307, 308 is not held (stalled). In the rare event of virtual-to-real address aliasing, if the effective addresses do not overlap, but the real addresses do, the load is flushed. (Because the execution cluster 307, 308 was not held (stalled), processor 210 is unable to forward store data to the load.) If the 16-bit effective address of the load matches a store address queue entry, then the execution cluster 307, 308 is held (stalled) in anticipation of either a load-hit-store flush, or a store data forwarding. If the real addresses match the following cycle, then the present invention determines if forwarding conforms to the rules described above. Otherwise, the load is flushed.

Note that if the 16-bit effective addresses match, but the real addresses do not match, a flush takes place even though no load-hit-store condition occurred. This results in a false load-hit-store detection and causes the unnecessary cancellation of instruction execution. The present invention compares the four extra effective address bits to reduce this occurrence. The penalty of these false load-hit-stores was much less than the performance gained by the occurrence of store forwarding. The implementation of store forwarding that resulted increases the percentage of loads which can be executed without causing an increased cycle time. Therefore, the overall performance of the microprocessor 210 is improved by this implementation of store forwarding.

With respect to Note 1 in FIG. 8, the load data could have been correctly retrieved during the previous cycle. However, because of the 16-bit EA compare, the process determined that a potential load-hit-store condition occurred and opted to hold the execution cluster 307, 308 forcing the store unit 302 to either forward data from the store data queue 304, or flush the load instruction.

With respect to Note 2 in FIG. 8, address space aliasing occurs when the 16-bit effective addresses do not overlap, but the real addresses do overlap. The processor 210 detects this situation to execute correctly. Since the execution cluster 307, 308 was not held (stalled), the invention forfeits the option of forwarding store data to the load. However, this situation is extremely rare.

The lower address bits used in the 12-bit comparison are not affected by translation and a lack of a match guarantees that there is no load-hit-store conflict or store forwarding opportunity. However, the remaining bits used to perform the 16-bit comparison are translated. Therefore, the initial steps which result from the outcome of the 16-bit comparison are essentially based on the prediction that a match (or non-match) between the additional effective address bits accurately reflects a match (or non-match) between the entire set of translated bits for both addresses. Note that in all cases where this prediction is incorrect, the load operation (and subsequent instructions) are flushed and refetched, recovering from the misprediction.

The Cases shown in FIGS. 8 and 9 are:

Case A—No load store overlap.
    Either the bottom 12-bits of the EA did not match any store entries, or
    if the bottom 12-bits matched, the bottom 16-bits of the EA did not match and the page address compare the following cycle was false for that store entry.

Case B—Cluster hold exerted and unable to forward data.
    16-bit EA overlap compare and unable to forward data→FLUSH.
    Either load-hit-store and unable to forward data, or page address mismatch and therefore unable to forward data.

Case C—Load-hit-store with store forwarding data to load.

Case D—Load-hit-store where the bottom 16-bit effective addresses do not match, but because of virtual to real address aliasing, the real address of the load overlaps with the real address of a store. If the real addresses are equivalent, but the effective addresses do not match, processor 210 does not forward data in this rare aliasing case to alleviate cycle time problems.

Although the present invention and its advantages have been described in detail, it should be understood that various changes, substitutions and alterations can be made herein without departing from the spirit and scope of the invention as defined by the appended claims.

What is claimed is:

1. A method for forwarding data resulting from a store instruction to a load instruction, wherein said store instruction has not yet updated said data when said load instruction is executing, said method comprising the steps of:

determining if there are any common bytes between a data address of said load instruction and a data address of said store instruction;

determining if said load instruction is logically subsequent to said store instruction; and forwarding said data to said load instruction if there are any common bytes between said data address of said load instruction and said data address of said store instruction, and if said load instruction is logically subsequent to said store instruction, wherein said step of determining if there are any common bytes between said data address of said load instruction and said data address of said store instruction further comprises the steps of:

comparing effective addresses of said load instruction and said store instruction; and comparing real addresses of said load instruction and said store instruction.

2. The method as recited in claim 1, wherein said step of comparing said effective addresses further comprises the steps of:

comparing low-order N bits of said effective addresses of said load instruction and said store instruction; and comparing low-order M bits of said effective addresses of said load instruction and said store instruction, wherein N is less than M.

3. In a data processing system including a processor coupled to a memory system via a system bus, a method comprising the steps of:

dispatching a store instruction to a store execution unit;

executing said store instruction in said store execution unit;

transferring said store instruction to a store address queue after said execution of said store instruction, wherein data associated with said store instruction is in a store data queue;

dispatching a load instruction to a load execution unit, wherein said load instruction is logically subsequent to said store instruction;

executing said load instruction in said load execution unit;

comparing an effective address of said load instruction with an effective address of said store instruction;

comparing a real address of said load instruction with a real address of said store instruction if said effective address of said load instruction matches said effective address of said store instruction; and forwarding said data from said store data queue to said load instruction if said real address of said load instruction matches said real address of said store instruction.

4. The method as recited in claim 3, wherein said forwarding step is performed if said data is available.

5. The method as recited in claim 3, wherein an address of the data operated on by the store instruction in said store address queue has been translated.

6. The method as recited in claim 3, wherein said step of comparing said effective addresses further comprises the steps of:

comparing low-order N bits of said effective addresses of said load instruction and said store instruction; and comparing low-order M bits of said effective addresses of said load instruction and said store instruction, if said low-order N bits match, wherein N is less than M.

7. A processor comprising:

an instruction dispatch unit;

a load execution unit operable for receiving a load instruction from said instruction dispatch unit;

a store execution unit operable for receiving a store instruction from said instruction dispatch unit, wherein said load instruction is logically subsequent to said store instruction;

a store data queue coupled to said store execution unit;

a store address queue coupled to said store execution unit;

circuitry for executing said store instruction in said store execution unit;

circuitry for transferring said store instruction to said store address queue after said execution of said store instruction, wherein data associated with said store instruction is in said store data queue;

circuitry for executing said load instruction in said load execution unit;

circuitry for comparing a data address of said load instruction with a data address of said store instruction; and circuitry for forwarding said data from said store data queue to said load instruction if said data address of said load instruction matches said data address of said store instruction, wherein said comparing circuitry further comprises:

circuit for comparing an effective address of said load instruction with an effective address of said store instruction; and circuitry for comparing a real address of said load instruction with a real address of said store instruction if said effective address of said load instruction matches said effective address of said store instruction wherein said forwarding of said data is performed if said real addresses match.

8. The processor as recited in claim 7, wherein said circuitry for comparing said effective addresses further comprises:

circuitry for comparing low-order 12 bits of said effective addresses of said load instruction and said store instruction; and circuitry for comparing low-order 16 bits of said effective addresses of said load instruction and said store instruction.

9. In a processor, a method for forwarding data from a store data queue and resulting from a store instruction to a load instruction while said load instruction is executing in a load execution unit, said method comprising the steps of:

determining if there are any common bytes between an effective address of said load instruction and an effective address of said store instruction;

holding said load instruction in said load execution unit if there are any common bytes between said effective address of said load instruction and said effective address of said store instruction;

determining if a real address of said load instruction matches a real address of said store instruction; and forwarding said data to said load execution unit if said real address of said load instruction matches said real address of said store instruction.

10. The method as recited in claim 9, further comprising the step of:

determining if said load instruction is logically subsequent to said store instruction.

11. The method as recited in claim 9, wherein said step of determining if said real address of said load instruction matches said real address of said store instruction is performed if there are any common bytes between said effective address of said load instruction and said effective address of said store instruction.

12. The method as recited in claim 9, wherein said step of determining if there are any common bytes between said effective address of said load instruction and said effective address of said store instruction further comprises the steps of:

comparing low-order N bits of said effective addresses of said load instruction and said store instruction; and comparing low-order M bits of said effective addresses of said load instruction and said store instruction, wherein N is less than M, if there is a match of said low-order N bits.

13. The method as recited in claim 12, further comprising the step of proceeding with normal execution of said load instruction if said low-order N bits do not match.

14. The method as recited in claim 12, further comprising the step of proceeding with normal execution of said load instruction if said low-order M bits do not match.

15. The method as recited in claim 11, further comprising the step of flushing said load instruction if said real addresses do not match.

16. In a processor, a method comprising the steps of:

comparing an effective address of a load instruction with an effective address of a store instruction; and predicting whether a real address of said load instruction will match a real address of a store instruction as a function of whether said effective address of said load instruction matches said effective address of said store instruction.

17. The method as recited in claim 16, wherein said predicting step further comprises the step of predicting that said real address of said load instruction will match said real address of said store instruction if said effective address of said load instruction matches said effective address of said store instruction.

18. The method as recited in claim 17, wherein said load instruction is being executed by a load execution unit, and wherein said method further comprises the step of holding execution of said load instruction if said effective address of said load instruction matches said effective address of said store instruction.

19. The method as recited in claim 18, further comprising the step of proceeding with normal execution of said load instruction if said effective address of said load instruction does not match said effective address of said store instruction.

20. The method as recited in claim 18, further comprising the step of flushing said load instruction if said real address of said load instruction does not match said real address of said store instruction.

21. The method as recited in claim 18, further comprising the step of forwarding data associated with said store instruction to said load execution unit when said real address of said load instruction matches said real address of said store instruction.

22. The method as recited in claim 17, wherein said step of comparing said effective address of said load instruction with said effective address of said store instruction further comprises the steps of:

comparing low-order N bits of said effective addresses of said load instruction and said store instruction; and comparing low-order M bits of said effective addresses of said load instruction and said store instruction, wherein N is less than M, if there is a match of said low-order N bits.

23. The method as recited in claim 16, wherein said predicting step further comprises the step of predicting that said real address of said load instruction will not match said real address of said store instruction if said effective address of said load instruction does not match said effective address of said store instruction.

24. The method as recited in claim 23, further comprising the step of flushing said load instruction if said real address of said load instruction matches said real address of said store instruction.

* * * * *